US007910034B2

(12) United States Patent
Dettinger et al.

(10) Patent No.: US 7,910,034 B2
(45) Date of Patent: Mar. 22, 2011

(54) INJECTION-MOLDING ARRANGEMENT AND METHOD OF MOLDING ON A MOLDED PART AND USE OF AN INJECTION-MOLDING ARRANGEMENT

(75) Inventors: Jürgen Dettinger, Unterensingen (DE); Peter Borst, Unlingen (DE)

(73) Assignee: Rolf Prettl, Tuebingen (DE)

( * ) Notice: Subject to any disclaimer, the term of this patent is extended or adjusted under 35 U.S.C. 154(b) by 731 days.

(21) Appl. No.: 11/829,724

(22) Filed: Jul. 27, 2007

(65) Prior Publication Data

US 2008/0026094 A1    Jan. 31, 2008

(30) Foreign Application Priority Data

Jul. 28, 2006  (DE) .......................... 10 2006 036 139

(51) Int. Cl.
*B29C 70/72* (2006.01)
*B29C 70/88* (2006.01)

(52) U.S. Cl. ............ 264/251; 249/95; 249/97; 264/260; 425/116; 425/121

(58) Field of Classification Search .................. 425/116, 425/121; 249/95, 96, 97; 264/251, 260
See application file for complete search history.

(56) References Cited

U.S. PATENT DOCUMENTS

| 3,135,020 | A | * | 6/1964 | Holl et al. .................. 425/129.1 |
| 4,882,116 | A | | 11/1989 | McMillen et al. |
| 4,883,671 | A | * | 11/1989 | Onodera et al. .............. 425/122 |
| 5,024,558 | A | * | 6/1991 | Mackal .......................... 425/121 |
| 5,073,326 | A | | 12/1991 | Craves et al. |
| 6,321,434 | B1 | * | 11/2001 | Kubota .......................... 29/425 |

FOREIGN PATENT DOCUMENTS

| DE | 49 001 | | 6/1966 |
| DE | 1 540 461 | | 9/1969 |
| DE | 20 48 279 | | 4/1972 |
| DE | 35 44 888 | A1 | 7/1986 |
| DE | 36 16 649 | A1 | 11/1987 |
| DE | 43 21 044 | A1 | 1/1995 |
| EP | 0298744 | A1 | 1/1989 |
| GB | 1442968 | A * | 7/1976 |
| JP | 11 345521 | A | 12/1999 |

* cited by examiner

*Primary Examiner* — Robert B Davis
(74) *Attorney, Agent, or Firm* — Knobbe Martens Olson & Bear LLP

(57) ABSTRACT

An injection-molding arrangement for molding a molded part is disclosed. In particular a grommet can be molded onto a cable. The arrangement has at least two injection-molding tools, which are arranged in a holding device offset in relation to each other along a longitudinal extent of a cable located in the injection-molding arrangement and enclose at least certain portions of the cable during the injection-molding operation. Furthermore, a method of molding on a molded part and use of the injection-molding arrangement for molding on a molded part is disclosed.

10 Claims, 4 Drawing Sheets

INJECTION-MOLDING ARRANGEMENT AND METHOD OF MOLDING ON A MOLDED PART AND USE OF AN INJECTION-MOLDING ARRANGEMENT

CROSS-REFERENCE TO RELATED APPLICATIONS

This application claims priority to German Patent Application No. 10 2006 036 139.3, filed on Jul. 28, 2006 with the title "Tüllenumspritzung".

BACKGROUND OF THE INVENTION

1. Field

The field relates to an injection-molding arrangement, and more particularly to a method of molding a molded part onto a cable and a use of an injection-molding arrangement for producing or processing cables.

2. Background

The increase in the variety of functions for technical devices makes it often necessary to transmit signals between various subassemblies. In spite of the available possibilities regarding cableless transmission, cable-bound transmission is still the means of choice for many applications, specifically with regard to reliability and fail safety.

If many electrical connections are required, the laying of individual cables is very time-consuming. It is therefore often customary to prefabricate a number of individual cables as a cable set or cable harness. The use of cable harnesses is known in particular in the area of motor vehicle production.

In order to secure the cable harness or parts of the cable harness in a technical device, it is known to provide parts of the cable harness with molded parts, in particular grommets. These grommets are used for guiding, securing and protecting the cable harness.

The grommets required are produced, in particular injection-molded as an individual part, and drawn onto the respective part of the cable harness or an individual cable. This involves a laborious process, in which it may be necessary for many grommets from a selection of various types of grommet to be drawn onto the cable.

At the same time, one disadvantage is that the production equipment or devices required are only designed for one type of grommet and can only be converted for other types with some effort. Furthermore, since they are pushed on, the grommets may slip in their position and therefore sometimes have to be adhesively bonded to the cable. Therefore, the production of a cable harness with the corresponding grommets is a relatively laborious and cost-intensive process.

BRIEF SUMMARY OF CERTAIN INVENTIVE ASPECTS

Some aspects present a low-cost device and a method, and also a use of an injection-molding arrangement for securing a molded part, in particular a grommet, to a cable. In particular, it is intended to make it possible with little effort to arrange a number of grommets of various forms and/or at various locations along the cable.

In general, a cable can be provided with an outer sheath. For this purpose, the cable can be guided through a constriction, at which a plastic melt, which forms the later outer sheath, is applied under overpressure. In order to make the applied outer sheath solidify, the then sheathed cable can be cooled under overpressure in a pressure cooling tube.

According to one aspect there is provided an injection-molding arrangement for molding a molded part, in particular a grommet, onto a cable, comprising at least two injection-molding tools, which are arranged in a holding device offset in relation to each other along a longitudinal extent of a cable located in the injection-molding arrangement and enclose at least certain portions of the cable during the injection-molding operation.

According to a further aspect there is provided a method of molding a molded part, in particular a grommet, onto a cable, with the following steps:
- introducing at least one cable into at least two injection-molding tools,
- enclosing the cable in at least two subregions of the cable by means of the injection-molding tools, so that the injection-molding tools form at least two cavities around the cable, and
- at least partially filling or completely filling, the cavities with an injection-molding compound.

According to yet a further aspect there is provided a use of an injection-molding arrangement described above for molding a molded part, in particular a grommet, onto a cable.

One feature is that the grommets are molded directly onto the cable to be fabricated. This already simplifies the production process considerably, since the grommets no longer have to be produced separately and the securing of the grommets on the cable can be ensured by the injection-molding operation.

Furthermore, in each case two grommets can be molded substantially simultaneously onto the cable by means of the two injection-molding tools. Even if the injection-molding tools are filled one after the other with injection-molding compound, there is still the advantage that the cable does not have to be removed after the production of the first grommet.

To produce further grommets on this cable, the cable can be placed at a different position in the injection-molding arrangement or in a further injection-molding arrangement with a different configuration of injection-molding tools. It is also possible to form the injection-molding tools in such a way that the desired molded parts are molded substantially simultaneously onto a number of cables. For example, it is conceivable to provide the injection-molding arrangement with at least two groups of injection-molding tools, it being possible in each case for a group to be assigned to one of a number of cables to be fabricated.

The fact that two grommets can be molded onto a cable substantially simultaneously—or if need be also one after the other—allows the fabrication of a cable or a cable harness to be made easier and speeded up. A reduction of the production costs can be realized.

According to one aspect, the injection-molding tools have a first tool part and a second tool part.

The tool parts can then be positioned in relation to each other in an opened position, in which the cable is placed into the injection-molding tools or the cable with the molded-on molded parts is removed from the injection-molding tool, and be positioned in a closed position, in which the injection-molding operation takes place. The tool parts are in this case moved towards each other along a substantially linear path.

According to a further aspect, the holding device has a first holding part, on which the first tool parts are arranged, and a second holding part, on which the second tool parts are arranged.

The holding parts make particularly easy handling and guiding of the first and second tool parts possible. If the first and second holding parts are moved towards each other, the first and second tool parts also move towards each other.

According to a further aspect, the first tool part has a base element and a molding insert arranged on or in the base element.

Various types of grommets can be produced in a simple way, by a corresponding molding insert for the respectively desired type of grommet being inserted into the base element. It is of course also possible to configure the second tool part as a two-part construction with a base element and a molding insert.

According to a further aspect, the first tool part and/or the second tool part is/are held displaceably, releasably and/or rotatably in the holding device.

This makes it possible to mold on grommets of various types and/or at various positions along the cable.

If the first tool part is only to be held displaceably, this can preferably be achieved by a guiding system, in particular a rail system. The first tool part can then slide along the rail system and be brought into various positions. The rail system may be realized in particular in a simple way with use of a projection or a groove and a respectively corresponding counterelement.

If the first tool part is merely to be held releasably in the holding device, the holding device may have receptacles at which the tool part is secured. Then, first tool parts for various types of grommet can be arranged at the receptacles.

If rotatability is desired, for example to allow a grommet to be applied to a cable with two different alignments, this can be brought about for example with use of a rotatable receptacle, or else by means of a receptacle which allows the tool part also to be inserted when it is turned through 180°.

The holding device may also be formed in such a way that a number of degrees of freedom are made possible, in particular both displacement and release of the first tool part. An embodiment for variably arranging tool parts for different types of grommet in the holding device is explained later.

According to a further aspect, at least one injection-molding tool is assigned a clamping element for securing a cable located in the injection-molding arrangement during the injection-molding operation.

In this case, the clamping element may be formed in one piece with the injection-molding tool or formed separately from the injection-molding tool. The clamping element may additionally or alternatively perform the function of sealing the injection-molding tool from the placed-in cable, in order to avoid injection-molding compound escaping from the injection-molding tool.

According to a further aspect, at least one injection-molding tool has a coding element, which can interact with a coding counterelement.

The coding element makes it possible to distinguish between different injection-molding tools, in particular those injection-molding tools that form different types of grommets. The coding element may be realized in many different ways: for example in a mechanical variant, in particular by one or more projections and/or recesses, or in an electrical variant, in particular by an assigned resistance, or else in an electronic variant, in particular by means of a circuit which makes it possible to read out an identification.

The special nature of the coding element can be illustrated particularly well if one considers a corresponding coding counterelement which can interact with the coding element. In this case, the coding counterelement represents a desired arrangement of specific injection-molding tools at specific locations along the cable. For example, the coding counterelement may describe that an injection-molding tool of a first type is expected at a first position and an injection-molding tool of a second type is expected at a second position.

If it is found that the coding element of the injection-molding tool and the coding counterelement match, this indicates that the correct injection-molding tool is located at the correct position. If no match can be found, this means that either the incorrect injection molding tool has been inserted and/or that the injection-molding tool is located at an incorrect position.

The coding counterelement may comprise a coding rail, which, with one or more projections and/or recesses, represents to a certain extent the negative of the coding element. The correct injection-molding tool at the correct position is obtained when the projection and/or the recess or the projections and/or recesses fit into one another. In one embodiment, it is explained later how the correct position can be predetermined for a number of specific injection-molding tools.

In a further aspect, at least one injection-molding tool is formed for encapsulating one end of a cable located in the injection-molding arrangement, to form a plug.

This allows the entire process of cable fabrication to be simplified still further and allows the production costs to be reduced further.

According to a further aspect, at least one injection-molding tool has a recess for the engagement of an ejecting device.

In this way, the removal of the cable with the molded-on molded parts from the injection-molding tool can be simplified, since the ejecting device can press out the assigned grommet with the cable.

The features mentioned above and those still to be explained below can be used not only in the combination specified in each case but also in other combinations or on their own without departing from the scope of the present invention.

BRIEF DESCRIPTION OF THE DRAWINGS

Embodiments explained in more detail in the description which follows and are represented in the drawings, in which.

DETAILED DESCRIPTION OF CERTAIN INVENTIVE EMBODIMENTS

Figure 1:
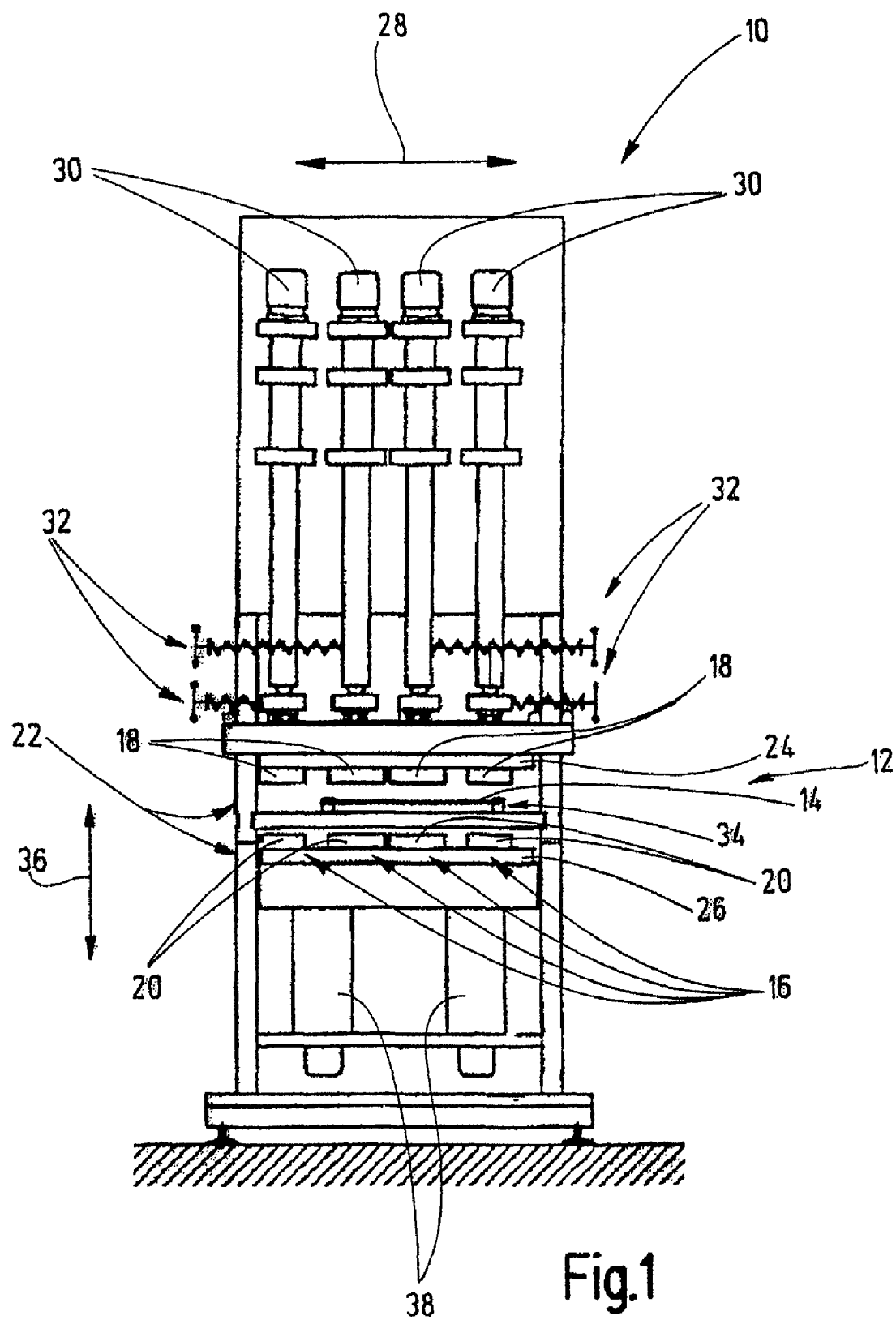
FIG. 1 shows an injection-molding machine with an injection-molding arrangement.

FIG. 1 shows an injection-molding machine 10 with an injection-molding arrangement 12 for molding a molded part, in particular a grommet, onto a cable 14.

The injection-molding arrangement 12 has in the case of this embodiment four injection-molding tools 16, which are respectively formed by an upper, first tool part 18 and a lower, second tool part 20. The injection-molding tools 16 are arranged in a holding device 22, which has an upper, first holding part 24 and a lower, second holding part 26.

The injection-molding tools 16 are arranged in the holding device 22 in such a way that they are offset in relation to one another along a longitudinal extent 28, indicated with the double-headed arrow, of the cable 14 located in the injection-molding arrangement 12.

Each injection-molding tool 16 is assigned an injecting device 30, the positions of which along the longitudinal extent 28 can be set with use of adjusting elements 32. With use of the injecting devices 30, an injection-molding compound is injected into the injection-molding tools 16. In this case, the injection-molding compound can be optionally injected into all the injection-molding tools 16 or else into selected injection-molding tools 16. It is also possible to use one injecting device for injecting the injection-molding compound into two or more injection-molding tools 16 one after the other.

It should be pointed out in this respect that, in the example shown here, the two middle injection-molding tools 16 are for molding grommets onto the cable 14 and that the injection-molding tool 16 on the right-hand side is used for forming a plug on the end 34 of the cable 14.

To mold the molded parts onto the cable 14, the following steps are carried out. First, the cable 14 is introduced into the injection-molding arrangement 12, between the first and second tool parts 18, 20 of the injection-molding tools 16. The cable 14 can either be placed in manually or fed in by machine.

When the cable 14 is located in the injection-molding arrangement 12, the first and second tool parts 18, 20 are moved towards each other, by the first and second holding parts 24, 26 being made to move towards each other along a vertical direction 36. In the case of the embodiment shown here, the first holding part 24 remains in its position, and the second holding part 36 is made to move upwards in the vertical direction 36 by two lifting devices 38. It is also possible to make the first holding part 24 move downwards, or else to move the first tool part 18 downwards, while at the same time the second holding part 26 maintains its position.

The relative movement of the first and second holding parts 24, 26 towards each other has the effect that the cable 14 is enclosed in a number of subregions by the injection-molding tools 16. Due to the shape of the first and second tool parts 18, 20, which will be shown more specifically below, cavities form around the cable 14. The cavities correspond in their shape to the respective molded part (here: grommet or plug) that is to be molded onto the cable 14.

Then, an injection-molding compound is filled into the cavities with use of the injecting devices 30. Once the injection-molding compound has reached an adequate solidity, the first and second tool parts 18, 20 are made to move apart again, and the cable 14 with the molded-on molded parts can be removed either manually or by machine. The removal of the cable 14 may be assisted with use of an ejecting device.

In this way, various molded parts can be efficiently molded onto a cable 14. It is also possible in principle for a cable 14 that has already been provided with some molded parts to be introduced into the injection-molding arrangement 12 again; then for example in a different position, in order to mold molded parts on at different locations of the cable.

Furthermore, the injection-molding tools 16 may be exchanged or offset, so that various molded parts, in particular various types of grommet, can be molded on at selected locations of the cable 14.

In this way, the injection-molding arrangement 12 according to the invention presents a possible way of providing cables 14 with molded parts, in particular also with complexly molded grommets, by relatively simple means.

Figure 2:
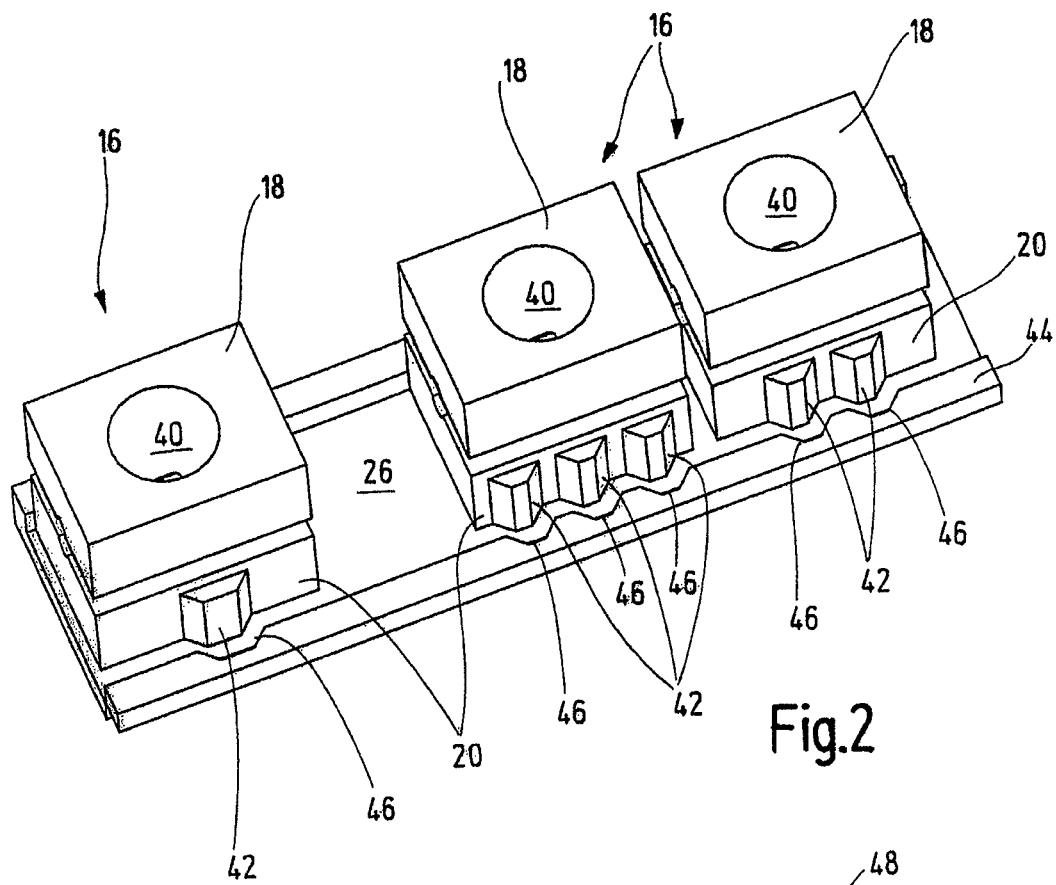
FIG. 2 shows three injection-molding tools with a coding counterelement on a holding part.

FIG. 2 shows an arrangement of three injection-molding devices 16, the second tool parts 20 of which are respectively arranged on a second holding part 26. The first tool parts 18 have here in each case approximately conical recesses 40, which serve for receiving a nozzle, in particular a hot-runner nozzle, for injecting the injection-molding compound. The injection-molding tools 16 can be released from the second holding part 26, to make it possible in this way for different injection-molding tools 16 to be inserted.

It is also possible in principle to insert the injection-molding tools 16 at different locations of the second holding part 26 and/or to displace the injection-molding tools 16 in the second holding part 26.

For the production process, which is generally intended to mold specific types of grommet on at specific positions, it may however be desirable to predetermine specific arrangements.

To be able to assign a specific type of injection-molding tool 16 to a specific location along the second holding part 26, the second tool parts 20 are provided with one or more coding elements 42. The coding elements 42 are formed here as projections, and a specific combination of coding elements 42 is assigned to a specific type of injection-molding tool 16.

For example, here a first injection-molding tool 16 (on the left), which is formed for molding a first type of grommet, is identified by a wide projection. A second injection-molding tool 16 (in the middle), which forms a second type of grommet, is identified by three narrow projections, which are respectively spaced from one another by a first distance. A third injection-molding tool 16 (on the right), which is formed for molding a third type of grommet, is identified by two narrow projections, which are spaced from one another by a second distance. Such a coding may also be performed on the first tool parts 18.

To allow the correct selection and the correct positioning of the injection-molding tools 16 to be checked or ensured, the coding elements 42 interact with a bar-shaped element 44, which has a plurality of coding counterelements 46, which are formed here as recesses. In the embodiment shown here, the coding counterelement 46 has recesses that are positioned in such a way that, when the coding elements 42 engage in the coding counterelements 46, the correct selection and the correct position of the injection-molding tools 16 are obtained.

If the bar-shaped element 44 with the coding counterelements 46 cannot be arranged to fit on the second holding part 26, this indicates that an incorrect injection-molding tool 16 has been inserted and/or an injection-molding tool 16 is located at an incorrect position.

By means of the coding elements 42 and the corresponding coding counterelements 46, the injection-molding arrangement 12 can be quickly re-configured and the correct configuration of the injection-molding arrangement 12 can be checked.

Figure 3:
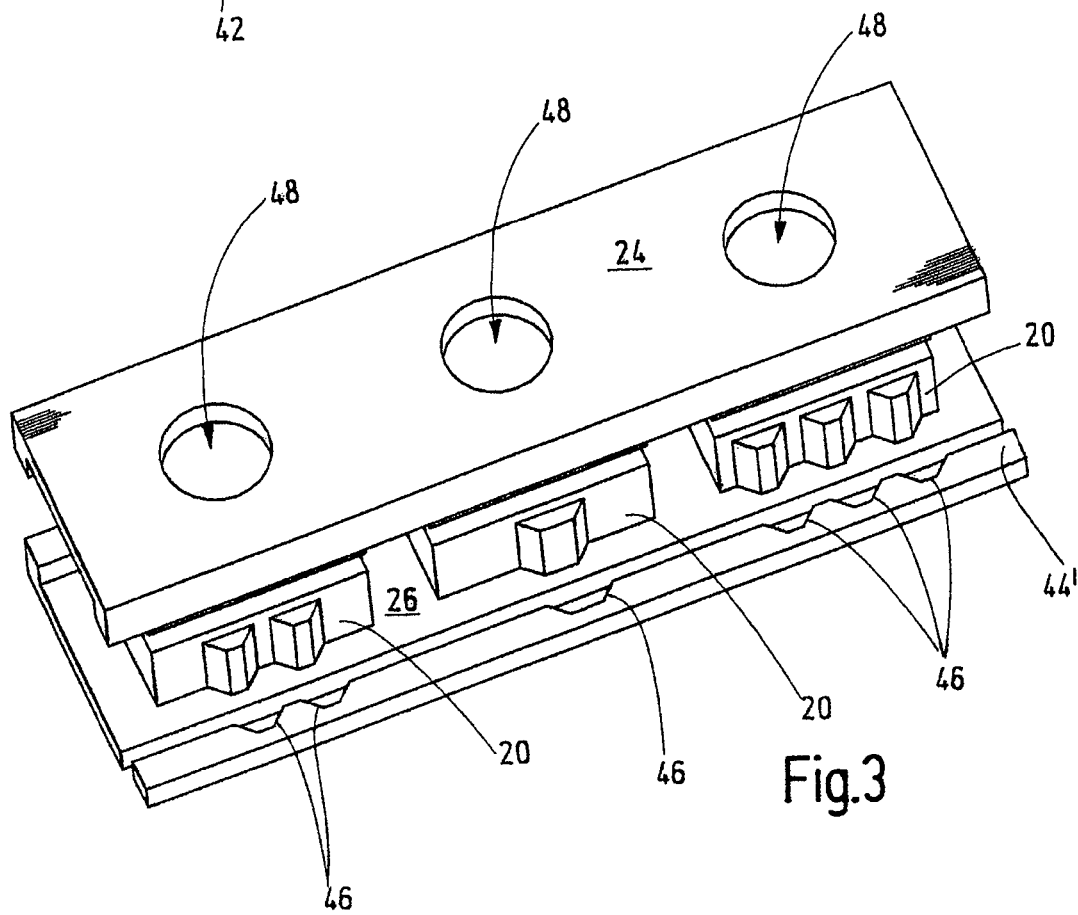
FIG. 3 shows the injection-molding tools according to FIG. 2 in another configuration with another coding counterelement and held between two holding parts.

FIG. 3 substantially corresponds to FIG. 2, although now a different bar-shaped element 44' with differently arranged coding counterelements 46 is shown and, furthermore, a first holding part 24 is represented.

The first holding part 24 comprises three openings 48, through which the nozzle for injecting the injection-molding compound can be guided. The injection-molding tools 16 are now in a further configuration, whereby a different arrangement of grommets can be molded onto the cable 14. The correct selection and correct positioning of the injection-molding tools 16 is also ensured here again by the coding elements 42 and the corresponding coding counterelements 46 in the bar-shaped element 44'.

Figure 4:
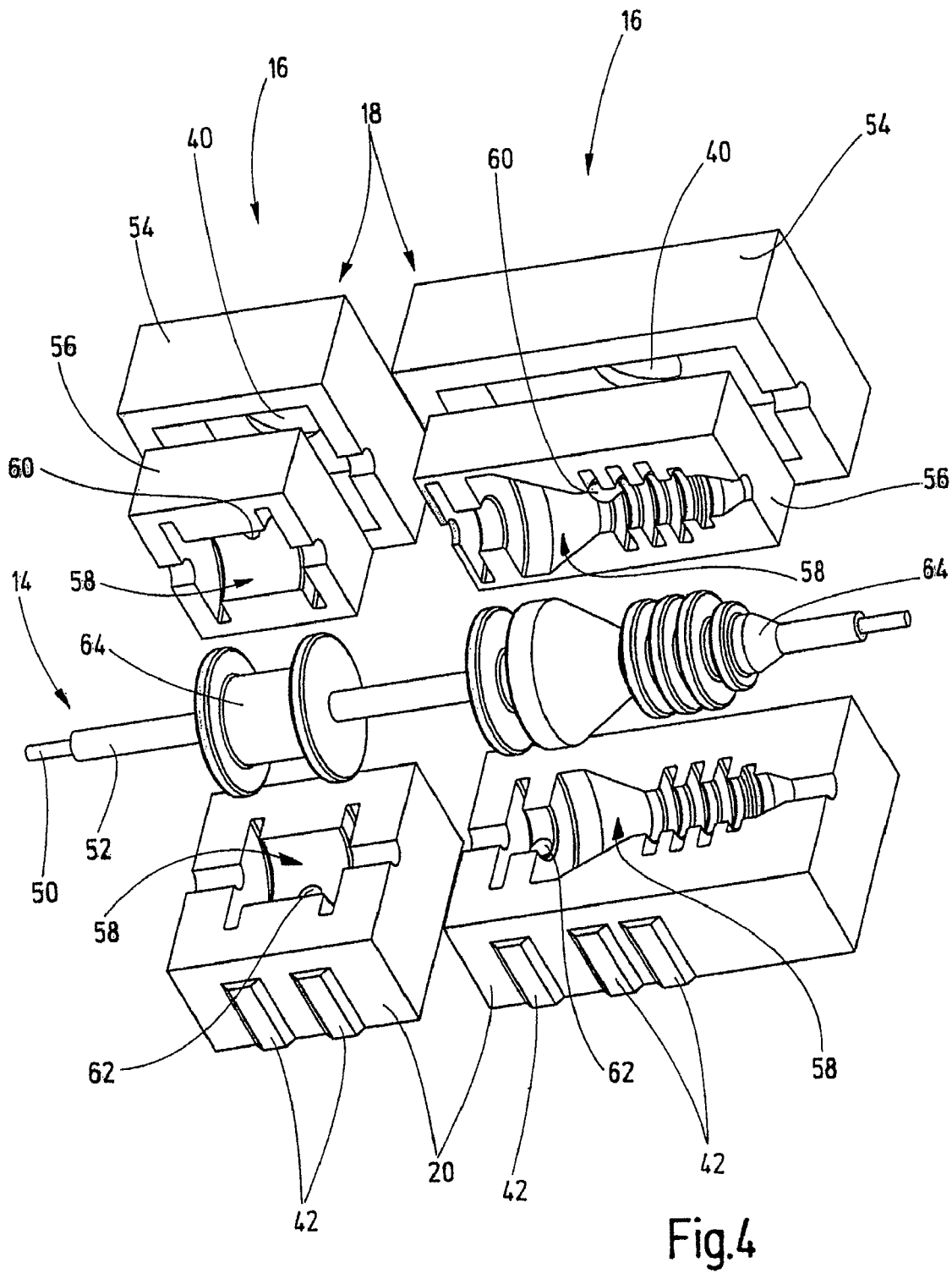
FIG. 4 shows a schematic representation of the injection-molding tools and two molded-on grommets.

FIG. 4 schematically shows the interaction between the individual elements of the injection-molding arrangement 12 with respect to the cable 14, which is represented here with a single core 50 and a sheathing 52.

Two injection-molding tools 16 are shown, formed for molding on two different types of grommet. The injection-molding tools 16 have in each case a first tool part 18 a second tool part 20. The first tool parts 18 are shown tilted by approximately 90° for the sake of better overall clarity.

The first tool parts 18 have in each case a base element 54 and a molding insert 56, which can be releasably inserted into the base element 54. In the molding inserts 56 and in the second tool parts 20, recesses can be seen, forming cavities 58 around the placed-in cable 14 before the injecting operation. Holes 60 can be seen in the molding inserts 56, constituting part of the conical recesses 40 and making it possible for the cavities 58 to be filled with injection-molding compound.

Shown in the case of the second tool parts 20 are recesses 62, in which an ejecting device respectively engages. When the cable 14 with the molded parts 64, which are configured here as grommets, is to be ejected, a pin of the ejecting device 62 respectively presses from below against the respective molded part 64 and pushes it out of the respective cavity 58.

Figure 5:
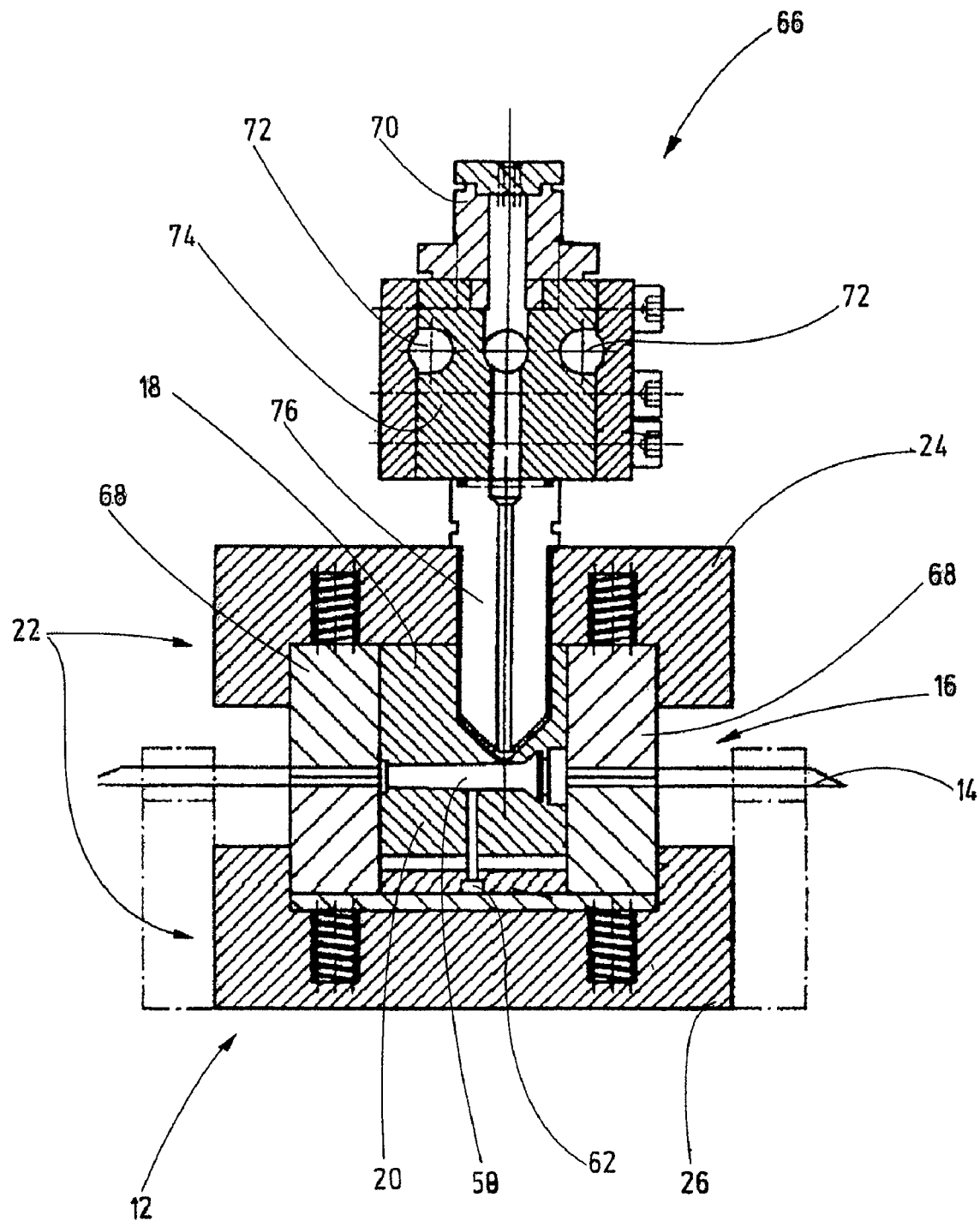
FIG. 5 shows a cross section through an injection-molding tool with an assigned injecting device.

FIG. 5 shows part of a further embodiment in a sectional representation. An injection-molding tool 16, a holding device 22 and an injecting head 66 are shown.

The injection molding tool 16 is assigned two clamping elements 68, which on the one hand firmly clamp the cable 14 during the injection-molding operation and on the other hand form terminations of the cavity 58 along the longitudinal extent of the cable 14. The clamping elements 68 are embodied here as cable clamping strips.

The injecting head 66 has a sprue bush 70, a heating cartridge 72, a hot-runner manifold 74 and a hot-runner nozzle 76.

In the injection-molding operation, the injection-molding compound is heated by the heating cartridge 72 and forced through the hot-runner nozzle 76 into the cavity 58. As a result, the cable located between the first tool part 18 and the second tool part 20 is encapsulated by the injection-molding compound and the desired molded part is formed.

The injection-molding arrangement shown shows a low-cost possibility of providing a cable with molded parts, in particular with grommets. Furthermore, some embodiments make a variable arrangement possible with respect to the position and type of the injection-molding tools, so that a large number of different arrangements of molded parts can be realized with use of the injection-molding arrangement. Furthermore, the use of the coding elements and corresponding coding counterelements provides the possibility of quickly performing changes in the configuration of the injection-molding tools and of checking the correct positioning and selection of the injection-molding tools.

What is claimed is:

1. An injection-molding device configured to mold a part onto a cable, the device comprising at least two injection-molding tools, which are arranged in a holding device offset in relation to each other along a longitudinal extent of a cable location in the injection-molding device and enclose at least certain portions of the cable during the injection-molding operation, wherein the injection-molding tools comprises at least a first tool part and at least a second tool part, wherein the holding device comprises a first holding part, on which the first tool part is arranged, and a second holding part, on which the second tool part is arranged, wherein the first tool part and/or the second tool part are displaceably held in the holding device.

2. The injection-molding device according to claim 1, wherein the first tool part comprises a base element and a molding insert arranged on or in the base element.

3. The injection-molding device according to 1, wherein the first tool part comprises a base element and a molding insert arranged on or in the base element.

4. The injection-molding device according to claim 1, wherein at least one injection-molding tool is assigned a clamping element for securing a cable located in the injection-molding arrangement during the injection-molding operation.

5. The injection-molding device according to claim 1, wherein at least one injection-molding tool comprises a coding element, which is configured to interact with a coding counterelement.

6. The injection-molding device according to claim 1, wherein at least one injection-molding tool is configured to encapsulate one end of a cable located in the injection-molding arrangement, to form a plug.

7. The injection-molding device according to claim 1, wherein at least one injection-molding tool has a recess for the engagement of an ejecting device.

8. A method of molding a part onto a cable, the method comprising:
introducing at least one cable into at least two injection-molding tools;
enclosing at least two subregions of the cable with the injection-molding tools, so that the injection-molding tools form at least one cavity around each subregion, wherein the injection-molding tools comprises at least a first tool part and at least a second tool part, wherein the holding device comprises a first holding part, on which the first tool part is arranged, and a second holding part, on which the second tool part is arranged; and
at least partially filling the cavities with an injection-molding compound, wherein the first tool part and/or the second tool part are displaceably held in the holding device.

9. The method according to claim 8, wherein selected injection-molding tools are arranged in an injection-molding arrangement and/or the injection-molding tools are positioned at selected locations of the injection-molding arrangement before the enclosing of the cable.

10. A method of molding a part onto a cable, the method comprising:
introducing a cable in an injection-molding device according to claim 1; and
operating the device.

* * * * *